United States Patent [19]

Forrest, Jr.

[11] Patent Number: 4,534,918
[45] Date of Patent: Aug. 13, 1985

[54] METHOD AND APPARATUS FOR THE ELECTROSTATIC PINNING OF POLYMERIC WEBS

[75] Inventor: Albert W. Forrest, Jr., Chillicothe, Ohio

[73] Assignee: E. I. Du Pont de Nemours and Company, Wilmington, Del.

[21] Appl. No.: 546,104

[22] Filed: Oct. 27, 1983

[51] Int. Cl.³ .............................................. B29D 7/22
[52] U.S. Cl. ................................. 264/22; 264/216; 425/174.8 E
[58] Field of Search ..................... 264/22, 24, 216; 425/174.8 E

[56] References Cited

U.S. PATENT DOCUMENTS

Re. 27,771 10/1973 Owens et al. ......................... 264/22

FOREIGN PATENT DOCUMENTS

| 2358989 | 6/1974 | Fed. Rep. of Germany ... 425/174.8 E |
| 2753711 | 6/1979 | Fed. Rep. of Germany ........ 264/22 |
| 51-41763 | 4/1976 | Japan ..................... 264/22 |
| 54-34370 | 3/1979 | Japan ..................... 264/22 |
| 1100414 | 1/1968 | United Kingdom ................... 264/22 |

Primary Examiner—Jeffery Thurlow

[57] ABSTRACT

A method and apparatus for enhancing the electrostatic pinning force on a freshly cast, polymeric web by generating primary and secondary electric fields and localizing the flow of current in the secondary field at spaced points through the width of the web. This is achieved by providing conductive pins projecting from a secondary electrode toward a primary electrode.

7 Claims, 4 Drawing Figures

METHOD AND APPARATUS FOR THE ELECTROSTATIC PINNING OF POLYMERIC WEBS

BACKGROUND

This invention relates generally to the production of film and, more particularly, to the electrostatic pinning of a freshly cast web to the surface of a quenching drum.

In existing machines, film is produced by extruding a web of molten, polymeric, film-forming material onto a quenching drum and then advancing the quenched web through stretching and slitting stations to windups. The use of a charged electrode adjacent the freshly cast web for generating an electrostatic field which pins the web to the drum was disclosed by Owens et al. in U.S. Pat. No. 3,223,757. In U.S. Pat. No. 3,655,307, Hawkins disclosed the possibility of increasing the through-put of a casting machine by adding a grounded, insulated electrode and thereby increasing the pinning force. A modification of the two electrode system was proposed by Segransan et al. in U.S. Pat. No. 4,244,894. In Segransan el al., the second electrode is a grounded, uninsulated reflector. Attempts to increase the through-put with such systems have not been successful because of nonuniform pinning through the width of the web.

SUMMARY

With the ion discharge device disclosed herein, an enhanced, pinning force is achieved by the provision of spaced, conductive pins projecting from a secondary electrode toward a charged, primary electrode in the form of a fine wire. According to the method of the present invention, the current in the electric field between the primary and secondary electrodes is localized at spaced points along the lengths of the electrodes.

DRAWINGS

DESCRIPTION

Figure 1:
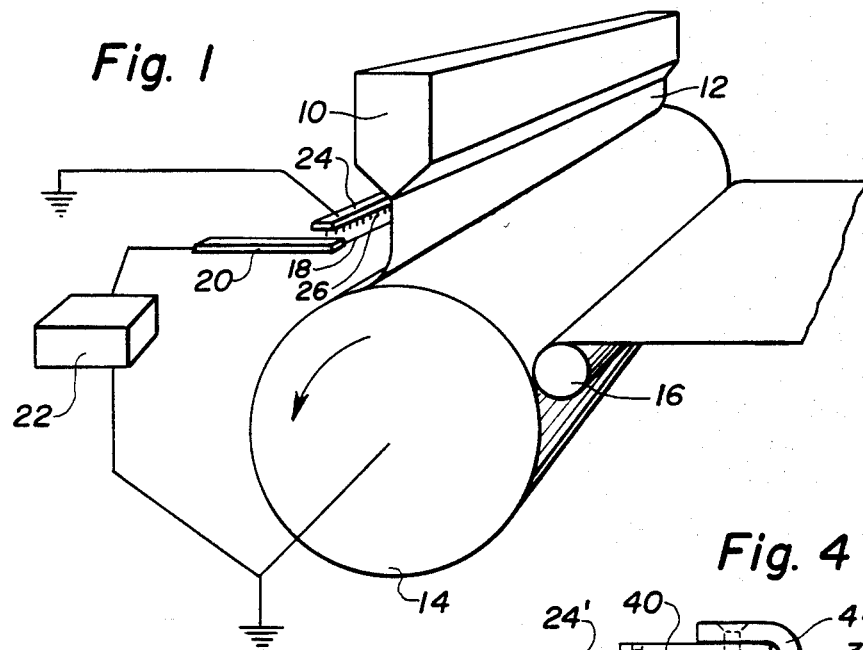
FIG. 1 is a perspective schematic showing the pinning device of the present invention in association with adjacent elements of a casting machine.

Referring to FIG. 1, the machine into which the pinning device of this invention has been incorporated includes a die 10 from which a web 12 of molten polymer is extruded and cast onto a grounded quenching drum 14. Web 12 is stripped from drum 14 and advanced over a roll 16 toward stretching stations from which the resulting thin film proceeds through a slitting station to windups.

Just above the line of first contact between web 12 and drum 14, an electrode 18 in the form of a conductive, fine wire is suspended between arms 20 which are located at each end of the drum beyond the edges of the web. Wire 18 is connected to a high voltage source 22 of direct current and functions as a primary electrode. A second, elongated, grounded electrode 24 in the form of a conductive bar is also positioned transversely of drum 14. Electrode 24 is located on the opposite side of electrode 18 from drum 14 and carries a plurality of equispaced, conductive pins 26, all of which are directed toward electrode 18.

Figure 2:
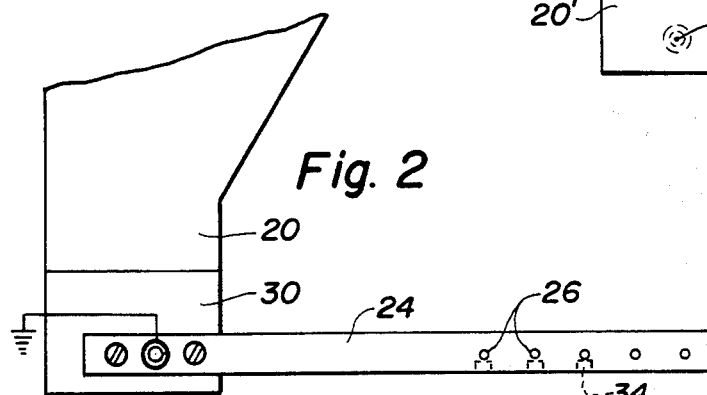
FIGS. 2 and 3 are fragmentary, top and elevational views, respectively, of the pinning device shown in FIG. 1.
Figure 3:
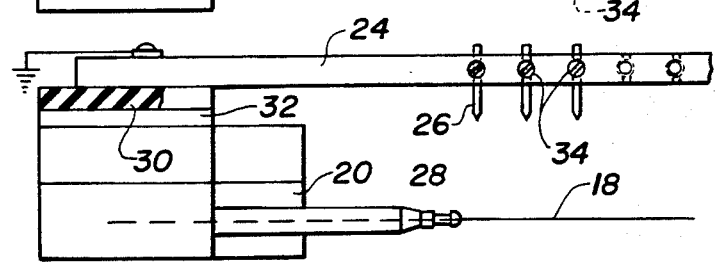

As shown in FIGS. 2 and 3, electrode 18 passes into arm 20 through a guide 28. Each end of the bar 24 is fastened to a mounting plate 30 of insulating material. Plate 30 is fastened to an intermediate, supporting plate 32 which, in turn is fastened to arm 20. Pins 26 pass through apertures in bar 24 and are held in place by set screws 34. Each pin 26 has a pointed end located adjacent the wire 18. The adjustments permitted by set screws 34 facilitate location of all pinpoints equidistant from wire 18.

In operation, the electric field around the charged electrode 18 ionizes the air. Ions of the same charge as the potential applied to electrode 18 are attracted to the grounded drum 14 and press or pin the web 12 to its surface. A secondary electric field is established between electrode 18 and the pointed pins 26. This secondary field produces a larger quantity of ions and thereby increases the pinning force on web 12.

The key feature of the ion discharge pinning device shown herein is the production of a stable current between the two electrodes which current is also uniform over the length of the charged wire 18. This is accomplished by the manner in which each pin focuses the electric field at its point, thereby insuring a localized flow of current through each pin. With a stable, uniform, secondary current, a larger quantity of ions is produced without detrimental arcing, and they are distributed uniformly across the width of web 12. These effects permit an effective increase in the rate at which molten polymer can be extruded from die 10.

In tests of an operable embodiment, the primary electrode 18 was charged positively and the device was used to pin both intermediate and heavy gage polyester webs. Pins 26 were tungsten and wire 18 was stainless steel. Pins 26 were 0.06 inch (0.15 cm) in diameter, 0.625 inch (1.56 cm) in length, and tapered in a 30° cone at their pointed ends. It was found that the key parameters are the diameters of the pinpoints and the fine wire 18. The most stable current flow was produced with pinpoint diameters of about 0.005 inch (0.13 mm) or less and a wire diameter of about 0.007 inch (0.18 mm). Other relationships can be adjusted to suit the operating conditions. Thus, the pin-to-wire spacing depends on the voltage applied to electrode 18 (5–15 kilovolts) and the ambient air temperature (212°–392° F., 100°–200° C.). Higher temperatures and voltages require larger pin-to-wire spacing (0.4–1.2 inch, 1–3 cm). The preferred voltage and spacing are 10 kilovolts (kv) and one inch (2.5 cm). The tests indicated that a uniform pinning force is best achieved with a pin spacing of about one half of the pin-to-wire spacing.

Figure 4:
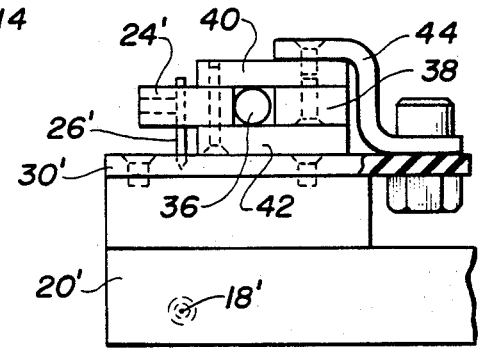
FIG. 4 is an end view of a modified pinning device.

In the embodiment shown in FIG. 4, a tubular heater 36 is located between bar 24' and a back bar 38. These three elements are sandwiched between upper and lower plates 40, 42 and the assembly is fastened to insulating plate 30' by a bracket 44. Plate 30' is fastened to arm 20'. Heating of the secondary electrode in this manner avoids condensation of volatile components from the freshly cast web 12 and, consequently, their deposition on the electrodes and pins.

When the pins are equispaced, as shown in FIGS. 1–3, the secondary electric field is not only stable but also uniform. In some instances, it could be advantageous to apply more pinning force at specified locations, e.g., adjacent the edges of the web and this would be accomplished by reducing the spacing between the pins at those locations. In other instances, e.g., where existing equipment would foreclose placement of the secondary electrode 24 above the primary electrode, as shown in FIG. 1, it could be placed alongside or even at a level below the primary electrode. Similarly, it is not a requisite that the pins 26 be pointed directly at electrode 18, as long as no other part of the secondary electrode is as close to the primary electrode as the pinpoints. These and other modifications will occur to those skilled in the art without departing from the spirit of the invention which, accordingly, is intended to be limited only by the scope of the appended claims.

What is claimed as new and desired to be secured by Letters Patent is:

1. In a pinning apparatus including a moving conductive grounded support for a polymeric web, an elongated charged electrode extending transversely of the support and a grounded electrode parallel therewith, the improvement comprising provision of conductive pins projecting from said grounded electrode, said pins having points located adjacent the charged electrode whereby to stabilize the flow of current between said electrodes.

2. An ion discharge device for pinning a freshly cast, polymeric web to a grounded quenching drum, said device comprising first and second electrodes, the first electrode being a charged, fine wire, the second electrode being a grounded bar having a plurality of spaced, conductive pins mounted thereon, said pins having points located adjacent said wire.

3. The device of claim 2 wherein the points are located equidistant from the wire.

4. The device of claim 3 wherein the bar has apertures therethrough for the pins and is provided with means permitting adjustment of the pins with respect to the bar and the wire.

5. The device of claim 4 wherein the pins are equispaced.

6. In a method including the steps of advancing a freshly cast polymeric web to a moving support and establishing electric fields between first and second electrodes as well as between the first electrode and the support, the improvment comprising the step of localizing the flow of current between the two electrodes at spaced points along the length thereof.

7. A method of establishing an enhanced, pinning force on a freshly cast, polymeric web comprising the steps of generating primary and secondary, electric fields extending through the width of the web and localizing the flow of current in said secondary field at spaced points.

* * * * *